Nov. 7, 1967   B. H. GOODWIN   3,351,171
ELEVATOR UNLOADING SPOUT

Filed Aug. 1, 1966   3 Sheets-Sheet 1

INVENTOR.
BENJAMIN H. GOODWIN
BY
ATTORNEYS

Nov. 7, 1967  B. H. GOODWIN  3,351,171
ELEVATOR UNLOADING SPOUT
Filed Aug. 1, 1966  3 Sheets-Sheet 2
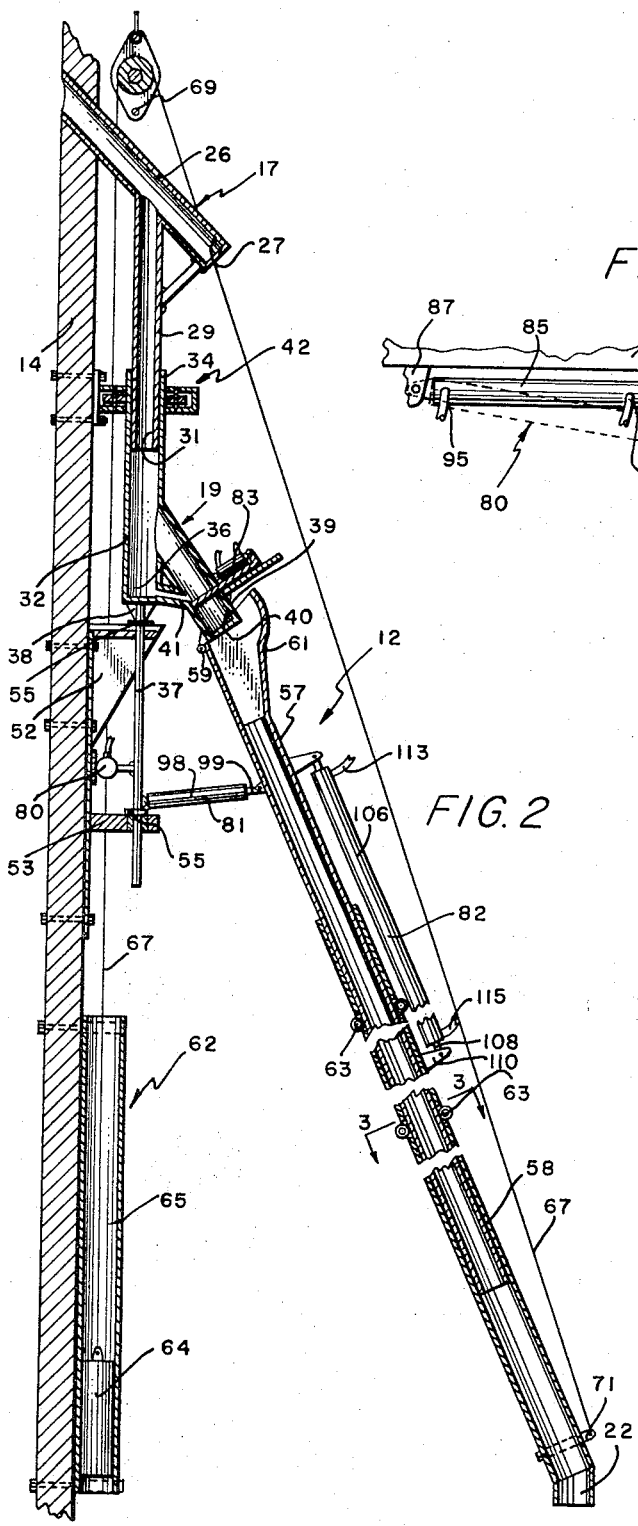
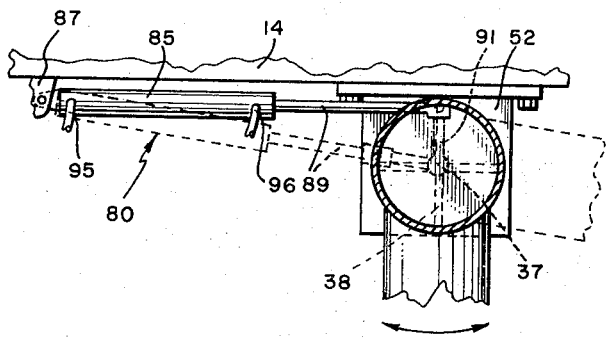
INVENTOR.
BENJAMIN H. GOODWIN
BY
ATTORNEYS Nov. 7, 1967  B. H. GOODWIN  3,351,171
ELEVATOR UNLOADING SPOUT
Filed Aug. 1, 1966  3 Sheets-Sheet 3
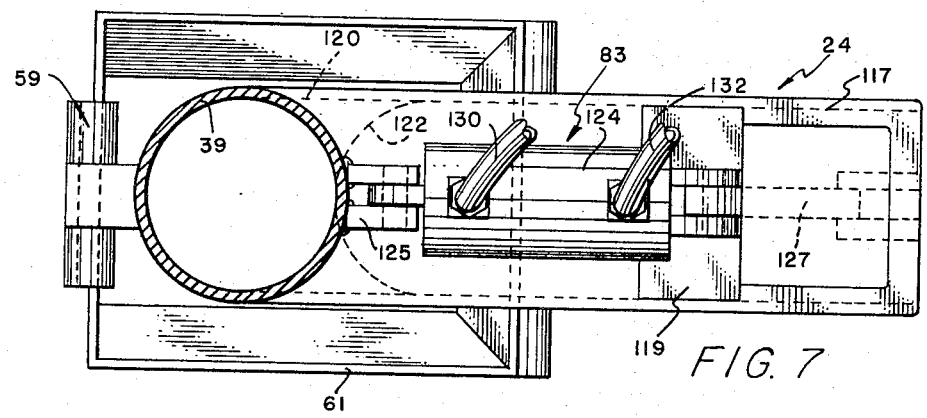
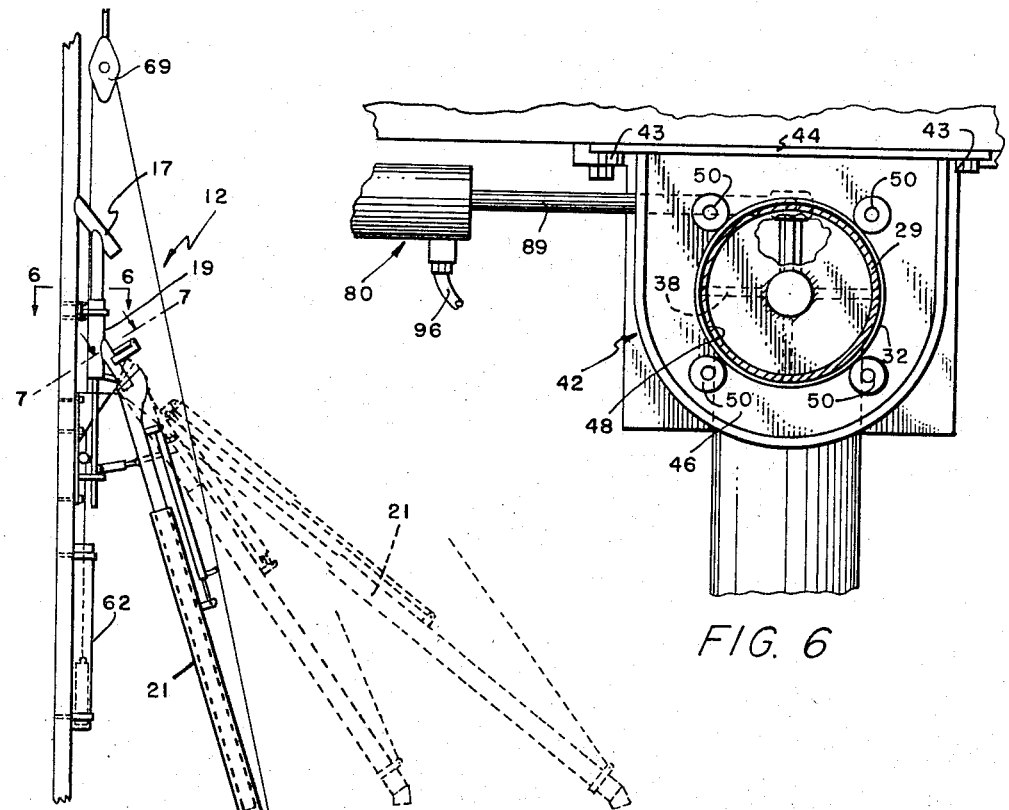
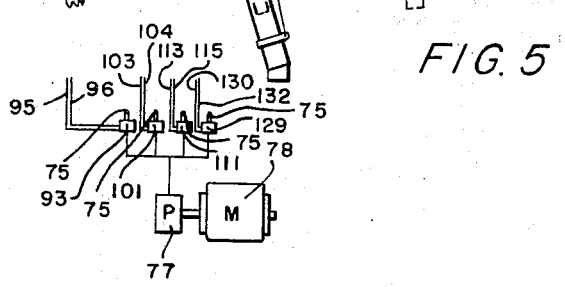
INVENTOR.
BENJAMIN H. GOODWIN
BY
ATTORNEYS

United States Patent Office 3,351,171
Patented Nov. 7, 1967

3,351,171
ELEVATOR UNLOADING SPOUT
Benjamin H. Goodwin, 5130 N. Broadway,
Wichita, Kans. 67219
Filed Aug. 1, 1966, Ser. No. 569,272
8 Claims. (Cl. 193—16)

This invention relates to an unloading apparatus, and more particularly, to a spout structure operable to unload grain elevators and the like. Still, more specifically, this invention relates to an unloader apparatus operable to discharge grain and the like at a desired given vertical height and lateral position from an elevator.

Various types of elevator unloading means are known to the prior art for conveying grains and the like. However, the prior art devices are substantially complicated in structure, limited in degrees of movement, and difficult to operate.

In accordance with the present invention, a new unloader apparatus for grain elevators and the like is provided which includes a conveyor assembly controlled by power means secured to the side of an elevator. The conveyor assembly includes a discharge means mounted on the elevator having a directing means rotatably connected thereto. The lower end of the directing means is connected to a spout means which extends laterally and downwardly of the elevator. An operator control housing is mounted on the side of the elevator and contains a plurality of hand levers to control the power means to properly position the spout means laterally, vertically, and horizontally. We have seen that the unloader apparatus is operable to discharge a quantity of grain or the like from the storage elevator into a given location such as the restricted opening of a train car or the like.

In preferred specific embodiments of the invention, the unloader apparatus includes a discharge means connected to the elevator operable to convey grain or the like downwardly into a directing means rotatably connected thereto. The directing means has an inclined tube member extended laterally of the discharge means with a spout means pivotally connected to the lower end thereof. Secured to the tube member is a gate means operable to open and close a discharge channel therethrough. The spout means has first and second telescoping elements with the first element pivotally connected to the directing means and the second telescoping element mounted about the first telescoping element for axial movement relative thereto. The unloader apparatus further includes hydraulic means having a plurality of piston and cylinder assemblies connected to the directing means and the telescoping elements to guide the spout means to a desired position. Additionally, another piston and cylinder assembly is secured to the gate means to control material flow therethrough. The piston and cylinder assemblies are operable to rotate the spout means to a proper vertical plane, elevate the spout means to achieve the proper angle of inclination, extend or retract the spout means to position a lower discharge nozzle at the proper height, and raise and lower the gate means to control the discharge of material therethrough.

Accordingly, it is an object of this invention to provide a new and novel unloader apparatus operable to convey grain material from a storage reservoir.

Another object of this invention is to provide a new unloader apparatus having a discharge spout means which is readily movable to the proper radial, horizontal, and vertical position.

Still another object of this invention is to provide a new unloader apparatus connectable to the side of a storage elevator having a discharge spout means movable by hydraulic means to a given location.

Still, another object of this invention is to provide an unloader apparatus having a discharge means connectable to the side of a storage reservoir to convey material therefrom, a directing means rotatably connected to the discharge means to convey material at an inclined angle relative to the elevator, a spout means having one end pivotally connected to the directing means to convey material downwardly, and a gate means connected to the directing means controlling the material flow therethrough.

Another object of this invention is to provide an unloader apparatus for conveying materials from a storage elevator that is economical to manufacture, simple to operate, compact, and substantially maintenance free.

Various other objects, advantages and features of the invention will become apparent to those skilled in the art from the following discussion, taken in conjunction with the accompanying drawings, in which:

FIG. 2 is an enlarged sectional view of the unloader apparatus of this invention shown as mounted on the side of a storage elevator;

FIG. 4 is an enlarged fragmentary sectional view taken along lines 4—4 of FIG. 2;

FIG. 5 is an elevational view of the unloader apparatus of the invention illustrating various operational positions thereof in dotted lines;

FIG. 6 is an enlarged fragmentary sectional view taken along lines 6—6 in FIG. 5; and FIG. 7 is an enlarged fragmentary sectional view taken along lines 7—7 in FIG. 5 illustrating the gate means of this invention.

Figure 3:
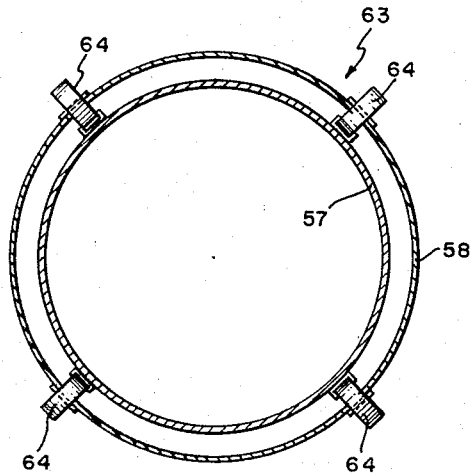
FIG. 3 is an enlarged sectional view taken along lines 3—3 in FIG. 2.

The following is a discussion and description of preferred specific embodiments of the new unloader apparatus of this invention, such being made with reference to the drawings, whereupon the same reference numerals are used to indicate the same or similar parts and/or structure. It is to be understood that such discussion and description is not to unduly limit the scope of the invention.

Figure 1:
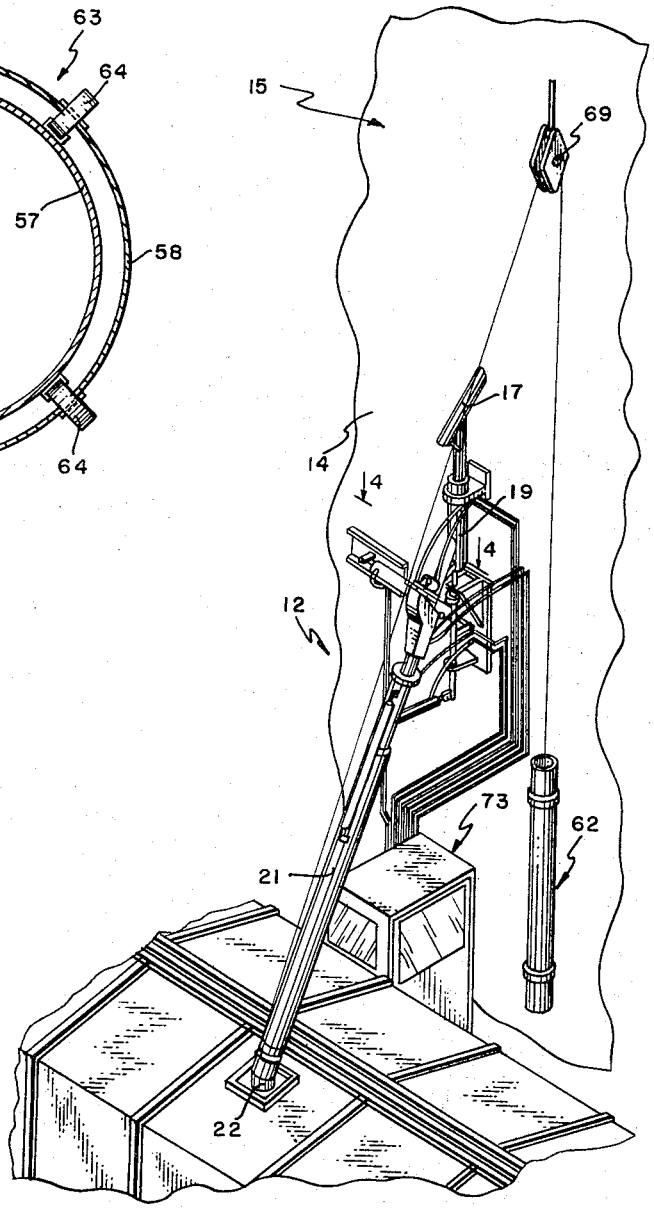
FIG. 1 is a perspective view of the unloader apparatus of this invention mounted on the side of a storage elevator illustrated as being used to fill a train car.

Referring to the drawings in detail and particularly to FIG. 1, the unloader apparatus of this invention, illustrated generally at 12, is shown as secured, as for example, to an upright sidewall 14 of a storage reservoir or elevator 15 to convey grain, flour and the like therefrom. The unloader apparatus 12 includes a discharge means 17 secured to the sidewall 14 conveying material laterally and downwardly, respectfully, therefrom; a directing means 19 rotatably connected to the discharge means 17 to convey the subject material laterally therefrom in a proper direction; and a spout means 21 pivotally connected to the directing means 19 for conveying material through a discharge nozzle member 22 for depositing in a given location. Additionally, the unloader apparatus 12 includes a gate means 24 secured to the directing means 19 to control flow of material therefrom and a hydraulic means 26 having a plurality of piston and cylinder assemblies to control operation of the gate means 24 and positioning of the spout means 21 thereby directing movement of material to the desired location.

More specifically, as shown in FIG. 2, the discharge means 17 has a first pipe member 26 secured to and extended transversely of the sidewall 14 at a downward outwardly incline. The outer end of the pipe member 26 has an inlet air opening 27 to aid in the flow of material such as grain therethrough as will become obvious. Intermediate opposite ends of the pipe member 26 is an integral vertically extended conduit 29 positioned adjacent the elevator 15 having a lower discharge opening 31 to guide material into the directing means 19.

The directing means 19 has an upright vertical cylindrical conduit section 32 with an open upper portion 34 mounted about the lower end of the conduit 29 and a lower sump portion 36 secured to an elongated shaft or rod 37. A plurality of gusset plates 38 are secured as by welding to the outer surface of the lower end of the cylindrical section 32 and the shaft 37 for added rigidity. Intermediate the upper and lower portions 34 and 36 of the cylindrical section 32 is a laterally extended exit conduit 39 having an outer opening 40 operable to convey material laterally therefrom. At the lower edge of the sump portion 36 is a bleed pipe or conduit 41 of rectangular shape in transverse cross section downwardly inclined and connected to the exit conduit 39. It is seen that the directing means 19 provides two paths of material through the upper opening of the exit conduit 39 and the relatively smaller bleed conduit 41.

In order to rotatably support the directing means 19, a bearing assembly 42 is mounted about the upper portion 34 and secured to the sidewall 14 by bolts 43 through a support plate 44. The bearing assembly 42 has a horizontally extended bearing plate 46 with a central opening 48 through which the conduit 29 and cylindrical section 32 are extended and a plurality of roller members 50 are pivotally secured to the bearing plate 46 and in contact with the cylindrical section 32. It is seen that the bearing assembly 42 operates to maintain the cylindrical section 32 in a vertical position while permitting the free rotation thereof about its axis.

Additionally, to provide vertical support to the directing means 19, an annular bracket member 52 and a guide bracket member 53 are secured to the sidewall 14 of the elevator 15 with the shaft 37 rotatably mounted therethrough. The bracket members 52 and 53 have thrust collars 55 mounted about the shaft 37 to adequately support the weight of the directing means 19, the spout means 21 and any material contained therein while permitting freedom of rotation.

As shown in FIG. 2, the spout means 21 includes first and second telescoping elements 57 and 58 having the first telescoping element 57 pivotally connected to the exit conduit 39 of the directing means 19 as by a bolt member 59. The first telescoping element 57 has an upper funnel portion 61 adapted to positively receive material from the directing means 19 notwithstanding the vertical or angular relationship of the spout means 21. The second telescoping element 58 is mounted about the first telescoping element 57 for relative axial movement thereto and held in a spaced relationship by a pair of spaced roll assemblies 63. More specifically as shown in FIG. 3, each roller assembly 63 consists of four rollers 64 rotatably mounted on the second telescoping element 58 and in contact with the first telescoping element 57 to assure trouble-free axial movement. The lower end of the second telescoping element 58 is integrally formed into the downwardly directing nozzle member 22 to properly control material discharged from the spout means 21.

As the weight of the spout means 21 and any material therein is a considerable load against the movement thereof, a counterbalance means 62 operates to hold the same in any given position. As shown in FIG. 7, the counterbalance means 62 has a weight 64 slidably mounted in tubular housing 65 secured to the sidewall 14 to assure proper axial vertical movement thereof. A cable 67 is attached to the upper end of the weight 64 and runs through a pulley 69 secured in an elevated position on the sidewall 14. The other free end of the cable 67 is secured as by a clamp 71 to the lower outer end of the second telescoping element 58. It is seen that the load of the weight 64 and position of the pulley 69 is adjusted to achieve a proper counterbalance for the spout means 21 resulting in an even leverage action notwithstanding the inclination of the spout means 21 at any given time.

In order to freely manipulate the spout means 21, the control system of the invention includes an operator's housing 73 mounted on the sidewall 14 of the elevator 15 at a position whereupon the operator therein can closely observe the position of the nozzle member 22 of the spout means 21 to accurately place the same in a desired location. Within the operator's housing 73 is a plurality of hand levers 75 operable to control fluid pressure from a pump 77 driven by a motor 78 therefrom to first, second, third and fourth piston and cylinder assemblies 80, 81, 82 and 83, respectively (FIG. 5).

More specifically as shown in FIG. 4, the first piston and cylinder assembly 80 has a cylinder 85 with one end pivotally connected to a bracket 87 mounted on the sidewall 14 and a piston rod 89 slidably movable therein. The outer end of the rod 89 is pivotally connected to a rocker arm 91 which has its other end rigidly secured to the shaft 37. On movement of the hand lever 75 to operate a first control valve 93, fluid under pressure is fed into one of lines 95 and 96 and exhaust fluid is returned through the other line into a reservoir (not shown) to axially move the piston rod 89. It is obvious that this movement of the rod 89 acts to pivot the rocker arm 91 and rotate this shaft 37 and the entire directing means 19 whereby the first piston and cylinder assembly 80 is operable to vary the vertical plane of the spout means 21 relative to the elevator 15.

The second piston and cylinder assembly 81 is similarly constructed having a cylinder 98 with one end pivotally connected to the shaft 37 and a piston rod 99 slidably mounted therein with its outer end pivotally connected to the upper portion of the first telescoping element 57. Another lever 75 is connected to a second control valve 101 and operable to control fluid through lines 103 and 104 to and from the cylinder 98. It is obvious that extension or retraction of the piston rod 99 operates to select the angle of inclination of the spout means 21 relative to the ground surface.

As best shown in FIG. 2, the third piston cylinder assembly 82 has one end of a cylinder 106 pivotally connected to the first telescoping element 57 and a piston rod 108 slidably mounted therein. The outer end of the piston rod 108 is pivotally connected to an ear 110 secured to the second telescoping element 58. A third control valve 111 is operable by one of the hand levers 75 to control fluid flow through lines 113 and 115 to the cylinder 106 for retraction and extension of the piston rod 108. This operates to axially move the second telescoping element 58 to position the discharge nozzle member 22 at a desired radial distance from the elevator 15.

As shown in FIG. 7, the fourth piston and cylinder assembly 83 is connected to the gate means 24 to control the flow of material through the directing means 19. The gate means 24 has a bracket housing 117 secured to the exit conduit 39 and having a closure plate 119 movable through an opening 120 in the conduit 39. The plate 119 has a curved end portion 122 conforming to the shape of the conduit 39 so as to be movable in sealing engagement therewith in a closed position. The fourth piston and cylinder assembly 83 has a cylinder 124 with one end pivotally connected to supports 125 welded to the exit conduit 39. A piston rod 127 is slidably mounted within the cylinder 124 with its outer end pivotally connected to the upper end of the closure plate 119. A fourth control valve 129 is operable by a last one of the hand levers 75 to supply fluid under pressure through lines 130 and 132 to raise and lower the closure plate 119 on axial movement of the piston rod 127. It is seen, therefore, that the gate means 24 is hydraulically actuated to selectively control the flow of material therethrough.

In the use and operation of the unloader apparatus 12 of this invention, the third piston and cylinder assembly 82 is operable to retract the second telescoping element 58 so that the first piston and cylinder assembly 80 can be operated to rotate the spout means 21 to the proper vertical plane without interference with any other objects. The second and third piston and cylinder assemblies 81 and 82 can then be selectively actuated to position the spout means 21 at the proper angle of inclination and extend the second telescoping element 58 as desired, respectively. On reaching the proper position such as within the confines of an opening into a train car for carrying grain as shown in FIG. 1, the fourth piston cylinder assembly 83 is actuated to raise the closure plate 119 and permit grain or the like to flow freely therethrough. The material flows through the discharge means 17 and stached within the cylindrical section 32 of the directing means 19 for main flow through the exit conduit 39 and limited flow through the bleed conduit 41. This novel structure prevents undue wear on the directing means 19 as the material itself absorbs all the wear and shock asociated with the change of flow direction to the exit conduit 39. Also, it is seen that the counterbalance means 62 has the weight 64 freely movable within the housing 65 to aid in holding spout means 21 in its given adjusted position.

As will be apparent from the foregoing description of the preferred embodiments of applicant's unloader apparatus, relatively simple and inexpensive means has been provided which is readily attachable to the sidewall of a grain elevator or the like so as to provide a freely adjustable conveyor structure for the movement of grain and the like therefrom. Applicant's construction eliminates a great deal of time-consuming and tedious work involved in controlling material flow by adjusting the direction and angle of conveyance thereof and results in a considerable time and monetary savings.

While the following invention has been described in connection with preferred specific embodiments thereof, it will be understood that this description is intended to illustrate and not to limit the scope of the invention, which is defined by the following claims.

I claim:
1. A spout apparatus adapted for unloading material from a reservoir and the like comprising:
 (a) discharge means secured to the reservoir and extended transversely thereof operable to convey the material therefrom,
 (b) directing means rotatably connected to said discharge means including an upright conduit having an exit section extended laterally therefrom,
 (c) spout means connected to said directing means being adapted to convey the material therethrough,
 (d) said upright conduit including a lower sump portion having a bleed conduit connected to said exit section adapted to convey material thereto,
 (e) power means connected to said directing means and said spout means operable to elevate, rotate, and horizontally position said discharge portion for directing material from the reservoir to a desired location.
2. A spout apparatus as described in claim 1, including:
 (a) gate means connected to said exit section operable to control flow of material into said spout means.
3. A spout apparatus as described in claim 1, including:
 (a) means connected to said spout means and the elevator to counterbalance the load of said spout means irrespective of relative position.
4. A spout apparatus as described in claim 1, wherein:
 (a) said directing means having an intake portion rotatably connected to said discharge means and a lower integral support shaft rotatably connected to the reservoir,
 (b) said power means including a first hydraulically actuated piston cylinder assembly connected to said shaft operable to rotate said directing means and said spout means about the axis of said shaft.
5. A spout apparatus as described in claim 1, wherein:
 (a) said power means having a hydraulic fluid pressure means connected to a first piston and cylinder assembly secured to said directing means to rotate the same, a second piston and cylinder assembly secured to said directing means and said spout means to vertically move the same, and a third piston and cylinder assembly secured to said spout to extend and retract the same.
6. A spout apparatus as described in claim 5, wherein:
 (a) said hydraulic means further including a fourth piston and cylinder assembly secured to said directing means operable to control material flow into said spout means, and a plurality of control levers connected to said first, second, third, and fourth piston and cylinder assemblies operable to rotate, raise and lower, extend and retract, and control material flow therethrough, respectively, of said spout means.
7. A spout apparatus as described in claim 1, wherein:
 (a) said discharge means having an inclined tube member secured to the elevator and an upright pipe integral with said tube member,
 (b) said directing means having said upright conduit mounted about said pipe for rotational movement and said exit section laterally inclined, and
 (c) said spout means having first and second telescoping elements, said second telescoping element having a lower discharge section,
 (d) said first telescoping element pivotally connected to said exit section whereby said discharge portion is positionable in the proper, angular relationship to the reservoir.
8. A spout apparatus as described in claim 7, wherein:
 (a) said power means including a hydraulic means having one piston and cylinder assembly connected to said discharge means and said first telescoping element to adjust the radial distance of said discharge portion from the elevator, another piston and cylinder assembly connected to said pipe member and said first telescoping element to adjust the vertical height of said discharge portion, and one other piston and cylinder assembly connected to said directing means for rotation thereof to adjust the direction of lateral extension of said spout means.

References Cited

UNITED STATES PATENTS

| | | | |
|---|---|---|---|
| 610,066 | 8/1898 | Kuser | 193—27 |
| 1,047,866 | 12/1912 | Weller | 193—16 |
| 1,791,371 | 2/1931 | Onstad | 193—3 |

ANDRES H. NIELSEN, *Primary Examiner.*